US010026127B2

(12) United States Patent
Buck

(10) Patent No.: US 10,026,127 B2
(45) Date of Patent: *Jul. 17, 2018

(54) DYNAMIC GENERATION OF ORDER ENTRY FIELDS ON A TRADING INTERFACE

(71) Applicant: Trading Technologies International, Inc., Chicago, IL (US)

(72) Inventor: Brian J. Buck, Livermore, CA (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/679,865

(22) Filed: Aug. 17, 2017

(65) Prior Publication Data

US 2017/0345095 A1    Nov. 30, 2017

Related U.S. Application Data

(63) Continuation of application No. 13/935,208, filed on Jul. 3, 2013, now Pat. No. 9,767,515.

(51) Int. Cl.
G06Q 40/00 (2012.01)
G06Q 40/04 (2012.01)
G06Q 30/08 (2012.01)

(52) U.S. Cl.
CPC ............. G06Q 40/04 (2013.01); G06Q 30/08 (2013.01); G06Q 40/00 (2013.01)

(58) Field of Classification Search
USPC .................................................... 705/44, 37
See application file for complete search history.

(56) References Cited

U.S. PATENT DOCUMENTS

| 5,596,699 A | 1/1997 | Driskell |
| 6,883,143 B2 | 4/2005 | Driskell |
| 7,546,550 B1 | 6/2009 | Buck |
| 7,559,036 B1 | 7/2009 | Buck |
| 7,580,883 B2 | 8/2009 | Borts |
| 8,027,908 B2 | 9/2011 | Borts |
| 8,037,422 B1 | 10/2011 | Buck |
| 8,510,206 B2 | 8/2013 | Faier |
| 8,620,794 B2 | 12/2013 | Borts |
| 8,688,568 B2 | 4/2014 | Faier |
| 8,713,478 B2 | 4/2014 | Buck |
| 9,646,344 B2 | 5/2017 | Borts |
| 2004/0117292 A1 | 6/2004 | Brumfield et al. |
| 2005/0060256 A1 | 3/2005 | Peterson et al. |
| 2005/0144113 A1 | 6/2005 | Opperman et al. |

(Continued)

OTHER PUBLICATIONS

International Search Report and Written Opinion for International Application No. PCT/US2014/043233 dated Oct. 1, 2014 (dated Nov. 3, 2014).

*Primary Examiner* — Jason Borlinghaus
*Assistant Examiner* — Ambreen A. Alladin
(74) *Attorney, Agent, or Firm* — McDonnell Boehnen Hulbert & Berghoff LLP

(57) ABSTRACT

Some embodiments of the invention provide systems and methods for displaying market data for a tradable object which are configured to generate order entry fields for display responsive to user input wherein the generated fields are automatically associated with a price for the tradable object to facilitate the timely placement of a trade.

9 Claims, 13 Drawing Sheets

(56) References Cited

U.S. PATENT DOCUMENTS

| | | |
|---|---|---|
| 2006/0155626 A1 | 7/2006 | Wigzell |
| 2007/0150401 A1 | 6/2007 | Brucato et al. |
| 2008/0243710 A1 | 10/2008 | Borts |
| 2009/0319950 A1 | 12/2009 | Borts |
| 2010/0030678 A9* | 2/2010 | Stearns .................. G06Q 40/04 705/37 |
| 2011/0270732 A1* | 11/2011 | Ritter ..................... G06Q 40/04 705/37 |
| 2011/0307371 A1 | 12/2011 | Borts |
| 2011/0320337 A1 | 12/2011 | Buck |
| 2012/0022991 A1 | 1/2012 | Faier |
| 2012/0173405 A1* | 7/2012 | Singer .................... G06Q 40/00 705/37 |
| 2012/0290465 A1 | 11/2012 | Kline et al. |
| 2012/0303507 A1 | 11/2012 | Arnold et al. |
| 2012/0303513 A1 | 11/2012 | Buck |
| 2014/0012727 A1 | 1/2014 | Faier |
| 2014/0195411 A1 | 7/2014 | Buck |
| 2014/0229359 A1 | 8/2014 | Borts |
| 2014/0330696 A1 | 11/2014 | Faier |
| 2015/0012406 A1 | 1/2015 | Buck |

* cited by examiner

| CON-A | ^ |  |
|---|---|---|
|  | 189 | 104 |
|  | 188 | 24 |
|  | 187 | 33 |
|  | 186 | 115 |
|  | 185 | 32 |
|  | 184 | 27 |
|  | 183 | 63 |
|  | 182 | 45 |
|  | 181 | 28 |
|  | 180 | 20 |
|  | 179 | 18 |
|  | 178 | 97 |
|  | 177 | 30 |
| 43 | 176 |  |
| 11 | 175 |  |
| 23 | 174 |  |
| 31 | 173 |  |
| 125 | 172 |  |
| 21 | 171 |  |

| CON-B | ^ |  |
|---|---|---|
|  | 189 | 104 |
|  | 188 | 24 |
|  | 187 | 33 |
|  | 186 | 115 |
|  | 185 | 32 |
|  | 184 | 27 |
|  | 183 | 63 |
|  | 182 | 45 |
|  | 181 | 28 |
|  | 180 | 20 |
|  | 179 | 18 |
|  | 178 | 97 |
| 43 | 177 | 30 |
| 11 | 176 |  |
| 23 | 175 |  |
| 31 | 174 |  |
|  | 173 |  |
| 125 | 172 |  |
| 21 | 171 |  |

*FIG. 12*

DYNAMIC GENERATION OF ORDER ENTRY FIELDS ON A TRADING INTERFACE

CROSS REFERENCE TO RELATED APPLICATIONS

This application is a continuation of U.S. patent application Ser. No. 13/935,208, filed Jul. 3, 2013, now U.S. Pat. No. 9,767,515, the contents of which are fully incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

It should be understood that the trading device may be any computing device, such as a personal computer, laptop computer, hand-held computer, tablet computer, smart phone or some other device that includes a display, user interface and includes hardware for communication with the electronic exchange.

Traders often use automated or semi-automated trading tools, collectively hereinafter referred to as automated tools, that automatically or semi-automatically send orders for tradable objects to the exchange. Many different trading tools are usually provided to, among other things, facilitate fast and accurate order entry. For instance, an automated or semi-automated tool might quickly calculate one or more order parameters, such as order price or order quantity, based on market conditions, or some other reference condition, and then automatically send an order with these parameters to an exchange for matching.

Traders frequently execute trading strategies that require the constant tracking of a large amount of individual tradable objects and the need to assimilate large amounts of data in order to recognize market trends, view current market conditions, and quickly enter, cancel, update, and modify orders. Thus, traders employ specialized trading interfaces for assistance. Trading interfaces present a variety of information, which may include the status of each tradable object in a line of numeric data fields covering key variables relevant to trading, such as price, quantity available at each price, the level of inside market, and others. Traders may regularly operate many such trading interfaces in order to track market conditions for a plurality of tradable objects and execute various trading strategies simultaneously. The use of multiple interfaces can become burdensome to a trader who needs to accurately view critical changes in the market conditions of a large number of tradable objects in order to quickly execute trades. Unless accommodations are made, the interfaces that are supposed to help the trader operate more efficiently and effectively can ultimately become overwhelming and inhibit the trader instead.

BRIEF DESCRIPTION OF THE FIGURES

Certain embodiments are disclosed with reference to the following drawings.

FIGS. 10-12 illustrate a pair of exemplary trading interfaces positioned to illustrate the effects of proximity on the generation of order entry fields for facilitating the execution of trades of the tradable object, among other things.

Figure 1:
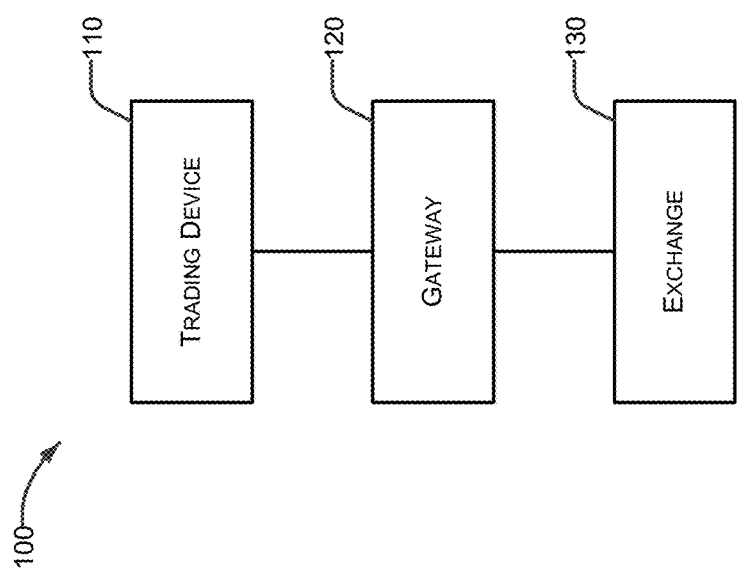
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments generally relate to systems and methods for providing trading interfaces that display market data in a manner that assists traders in executing trades. Some embodiments are directed to systems and methods for displaying market data on a trading interface relating to prices for trading a tradable object which are operatively configured to dynamically generate an order entry field for display on the trading interface in response to detecting or receiving an instance of user input through a data input device within an activation region defined on the trading interface in a positional relationship with market data relating to a unique price for trading the tradable object, wherein the instance of the user input in the activation region generates the display of the order entry field whereby the order entry field facilitates the execution of a trade of the tradable object at the unique price.

As used herein, the term "tradable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways. Furthermore, well known process steps and computer components may have not been described in detail herein in order to avoid unnecessarily obscuring the underlying concepts.

I. Brief Description of Certain Embodiments

In one embodiment, a method for displaying market data and facilitating the execution of trades through a computing device in communication with an electronic exchange is disclosed. The method comprises the steps of displaying a trading interface for presenting current market data In some embodiments, the trading interface includes a plurality of generally axially aligned value levels defining a central price axis, a plurality of ask regions and a plurality of bid regions. Each of the axially aligned value levels contains a current numerical price for a tradable object in sequential order along the price axis. Each ask region of the plurality of ask regions is transversely aligned to a value level relative to the central price axis and contains a numerical value representing a current ask quantity at the price displayed in the transversely aligned value level, thereby displaying a positional relationship between the current ask quantity and price along the central price axis. Each bid region of the plurality of bid regions is transversely aligned to a value level and contains a numerical value representing a current bid quantity at the price displayed in the transversely aligned value level, thereby displaying a positional relationship between the current bid quantity and price along the central price axis.

In one embodiment, a method as described herein includes the step of generating an order entry field for display on the trading interface in response to receiving an instance of user input within an activation region associated with the order entry field and defined within the trading interface in a positional relationship with a unique axially aligned value level of the plurality of axially aligned value levels, wherein the order entry field facilitates the execution of a trade of the tradable object at the price displayed in the unique axially aligned value level.

In another embodiment, a method for displaying market data and executing trade orders includes the step of displaying a trading interface for presenting current market data in an area of a display device. The trading interface may include value levels, ask regions, bid regions and order entry and associated activation regions defined within the trading interface in a transversely aligned positional relationship with the axially aligned value levels of the plurality of axially aligned value levels. The method of this embodiment may also include the step of generating an order entry field for display on the trading interface in response to positioning a cursor within an activation region, wherein the order entry field facilitates the execution of a trade of the tradable object at the price displayed in the transversely aligned value level.

Some embodiments of a system for displaying market data and executing trade orders which includes a computing device in a communication with an electronic exchange are also disclosed. The system comprises a display device for displaying a trading interface which may include all of the features described above and/or the features of the exemplary embodiments described herein below, and a data input device for generating an instance of user input within an activation region, wherein the computing device is configured to generate an order entry field and the associated activation region for display on the trading interface in response to receiving an instance of user input within an activation region, wherein the order entry field facilitates the execution of a trade of the tradable object at the price displayed in the transversely aligned value level.

Other embodiments are directed to a non-transitory computer-readable information recording medium which stores a program for controlling a computer to receive market data from an electronic exchange, the program comprising code for permitting the computer to perform the steps for displaying the trading interface including all of the features described above and/or the features of the exemplary embodiments described herein below, and generating an order entry field for display on the trading interface in response to receiving an instance of user input within an activation region associated with the order entry field and defined within the trading interface in a positional relationship with a unique axially aligned value level of the plurality of axially aligned value levels, wherein the order entry field facilitates the execution of a trade of the tradable object at the price displayed in the unique axially aligned value level.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradeable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
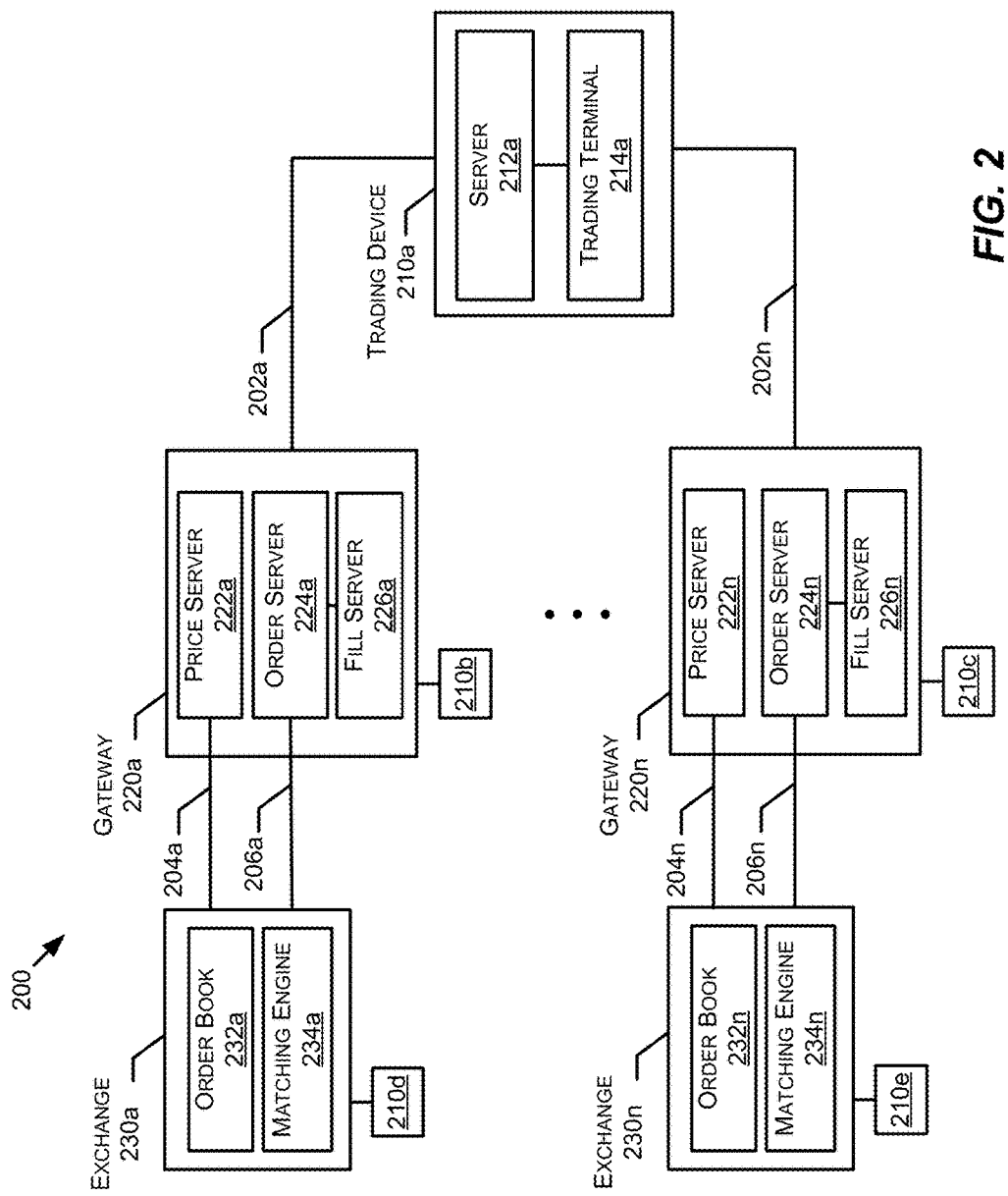
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210*a* is in communication with an exchange 230*a* through a gateway 220*a*. The following discussion mainly focuses on the trading device 210*a*, gateway 220*a*, and the exchange 230*a*. However, the trading device 210*a* may also be connected to and communicate with any number of gateways 220*n* connected to exchanges 230*n*. The communication between the trading device 110*a* and other exchanges 230*n* may be the same, similar, or different than the communication between the trading device 210*a* and exchange 230*a*. Generally, each exchange has its own preferred techniques and/or formats for communicating with a trading device, a gateway, the user, or another exchange.

The trading device 210*a*, which may be similar to the trading device 110 in FIG. 1, may include a server 212*a* in communication with a trading terminal 214*a*. The server 212*a* may be located geographically closer to the gateway 120 than the trading terminal 214*a*. As a result, the server 212*a* latency benefits that are not afforded to the trading terminal 214*a*. In operation, the trading terminal 214*a* may provide a trading screen to a user and communicate commands to the server 212*a* for further processing. For example, a trading algorithm may be deployed to the server 212*a* for execution based on market data. The server 212*a* may execute the trading algorithm without further input from the user. In another example, the server 212*a* may include a trading application providing automated trading tools and communicate back to the trading terminal 214*a*. The trading device 210*a* may include, additional, different, or fewer components.

The trading device 210*a* may communicate with the gateway 220*a* using one or more communication networks. As used herein, a communication network is any network, including the Internet, which facilitates or enables communication between, for example, the trading device 210*a*, the gateway 220*a* and the exchange 220*a*. For example, as shown in FIG. 2, the trading device 210*a* may communicate with the gateway 220*a* across a multicast communication network 202*a*. The data on the network 202 *a* may be logically separated by subject (for example, prices, orders, or fills). As a result, the server 212*a* and trading terminal 214*a* can subscribe to and receive data (for example, data relating to prices, orders, or fills) depending on their individual needs.

The gateway 220*a*, which may be similar to the gateway 120 of FIG. 1, may include a price server 222*a*, order server 224*a*, and fill server 226*a*. The gateway 220*a* may include additional, different, or fewer components. The price server 222*a* may process price data. Price data includes data related to a market for one or more tradeable objects. The order server 224*a* may process order data. Order data is data related to a user's trade orders. For example, order data may include order messages, confirmation messages, or other types of messages. The fill server collects and provides fill data. Fill data includes data relating to one or more fills of trade orders. For example, the fill server 226*a* may provide a record of trade orders, which have been routed through the order server 224*a*, that have and have not been filled. The servers 222*a*, 224*a*, 226*a* may run on the same machine or separate machines.

The gateway 220 *a* may communicate with the exchange 230*a* using one or more communication networks. For example, as shown in FIG. 2, there may be two communication networks connecting the gateway 220*a* and the exchange 230*a*. The network 204*a* may be used to communicate market data to the price server 222*a*. In some instances, the exchange 230*a* may include this data in a data feed that is published to subscribing devices. The network 206*a* may be used to communicate order data.

The exchange 230*a*, which may be similar to the exchange 130 of FIG. 1, may include an order book 232*a* and a matching engine 234*a*. The exchange 230 *a* may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
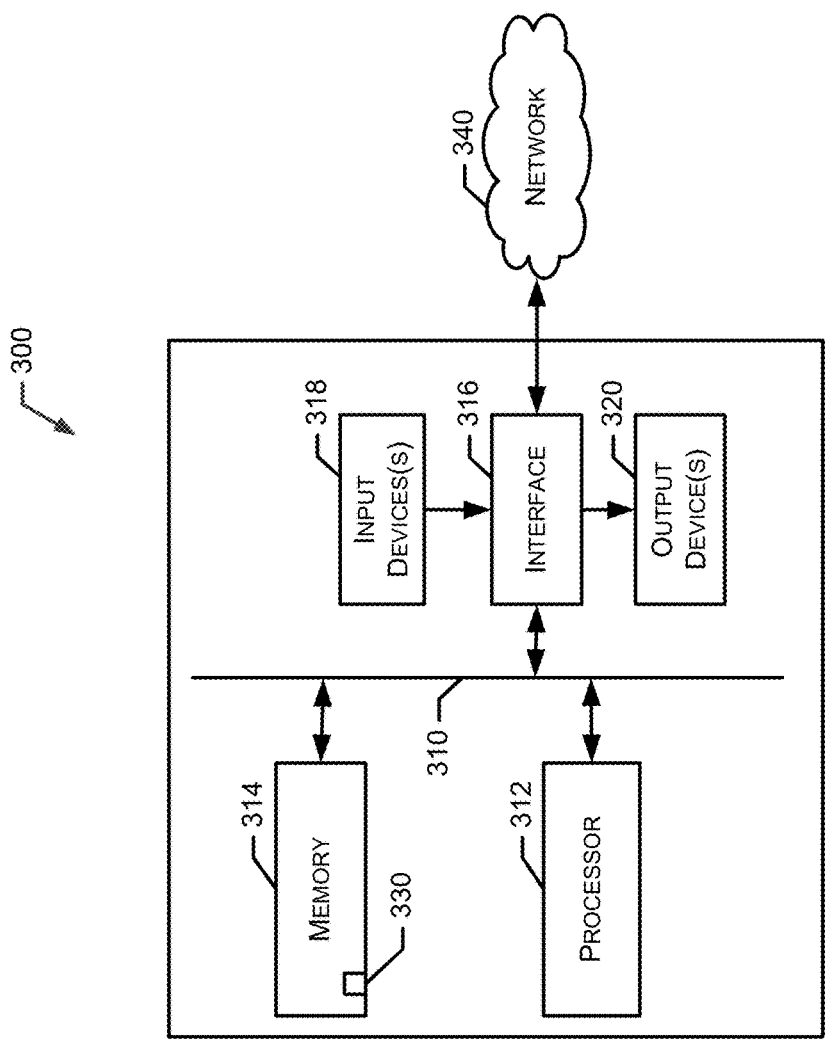
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Dynamically Generating Order Entry Fields

Exemplary embodiments described below include a trading interface that presents market data and dynamically generates order entry fields in response to user input which are intended to allow a trader to gain an accurate and comprehensive view of the current market conditions for a large number of tradable objects and execute trades quickly, among other things. The dynamically generated order entry fields provide a mechanism by which a user may enter an order via a trading interface configured and minimized to reduce the amount of display area necessary to utilize the displayed market data. The reduced footprint of the example trading interface configured allows the trader to display more information without having to sacrifice functionality such as the ability to enter trades efficiently. As used herein, the term "market data" is not intended to be limited to data and information describing trade orders and market conditions, and may include any information received directly or indirectly from the exchange 130 or data generated by the trading device 300. Embodiments discussed herein describe the user input as involving movement of a cursor about the trading interface which may be directed via a data input device such as a mouse, keyboard, touchpad or any alternative data input devices or means.

Figure 4:
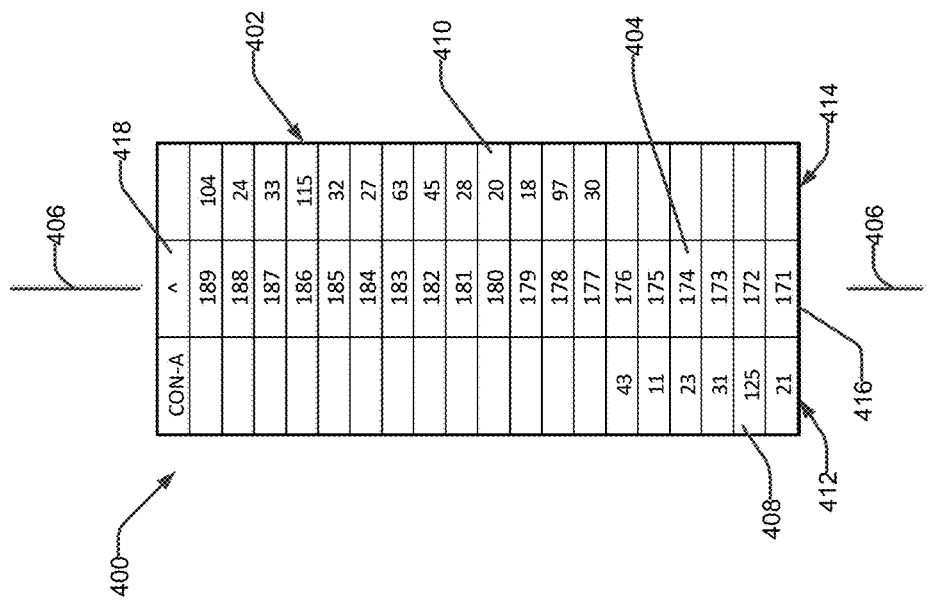
FIGS. 4-9 illustrate an exemplary trading interface for presenting market data relating to a tradable object which may be employed with certain disclosed embodiments and the generation of order entry fields for facilitating the execution of trades of the tradable object, among other things.

FIG. 4 provides an embodiment of an exemplary trading interface of the invention for presenting market data relating to a tradable object that is referred to herein as a trading interface 402. Interface 402 may be displayed in a display area 400 defined on any type of display device in communication with computing device 300, and may be connected with or otherwise comprise output device 320.

In this embodiment, trading interface 402 includes a plurality of value levels 404 arranged in axial alignment with one another defining a value axis 406. Interface 402 further includes a plurality of bid quantity regions 408 and a plurality of ask quantity regions 410. The plurality of bid quantity regions 408 are axially aligned with one another defining a bid quantity axis 412 having a centerline or axis aligned in parallel to value axis 406. The plurality of bid quantity regions 408 are located in a generally a transverse position with respect to value axis 406 defined by the plurality of value levels 404. The plurality of ask quantity regions 410 are axially aligned with one another defining an ask quantity axis 414 having A centerline or axis aligned in parallel to value axis 406. The plurality of ask quantity regions 410 are therefore located in a generally a transverse position with respect to value axis 406 defined by the plurality of value levels 404, similarly to the plurality of bid quantity regions 408 but on the opposing side of value axis 406 in this embodiment. In one embodiment, the value axis 406 along with the bid quantity axis 412 and ask quantity axis 414 are aligned and arranged to define a ladder trading interface or ladder interface.

Each value level 404 in interface 402 contains a numerical value representing a price for the tradable object. Either the bid quantity region 408 or the ask quantity region 410 transversely adjacent to each value level 404 may contain a numerical value representing the bid quantity or ask quantity for the tradable object at the numerical price shown in the corresponding value level 404. In this embodiment, the prices shown in value levels 404 are presented in sequential order from lowest price at a bottom 416 of interface 402 to highest price at a top 418 of interface 402.

Figure 5:
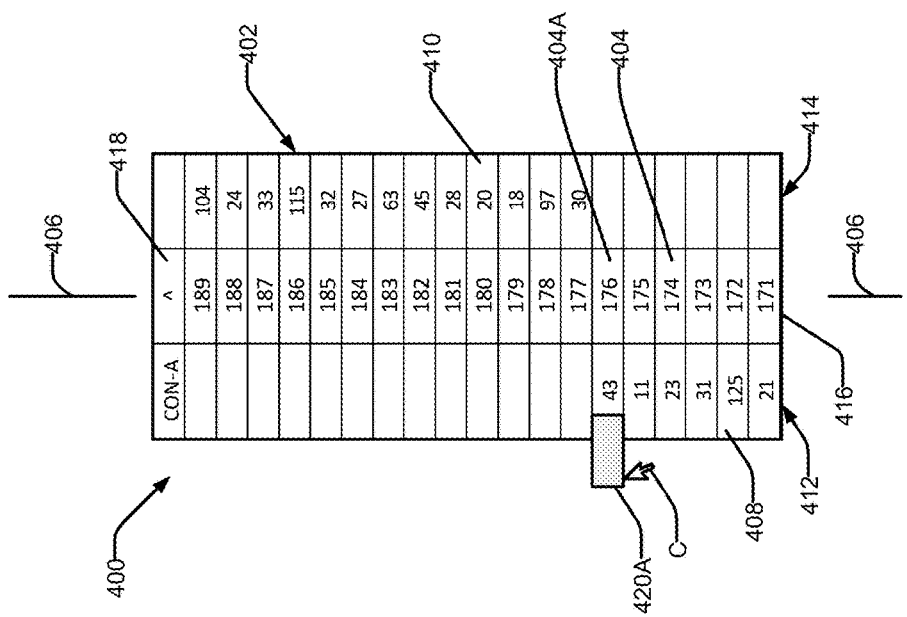
Figure 6:
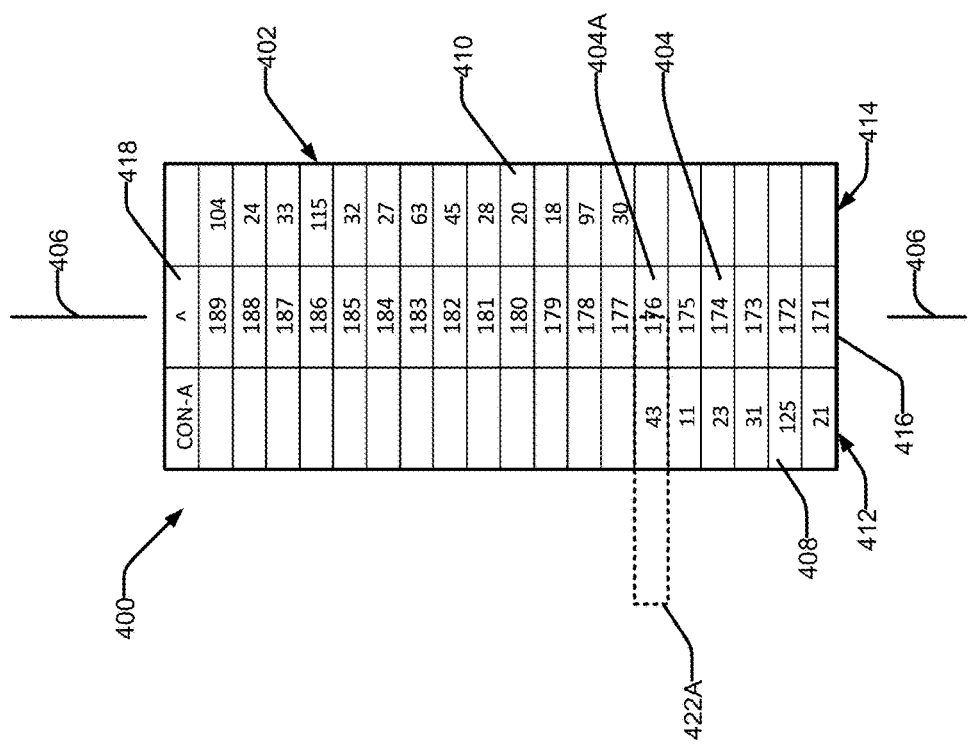
Figure 7:
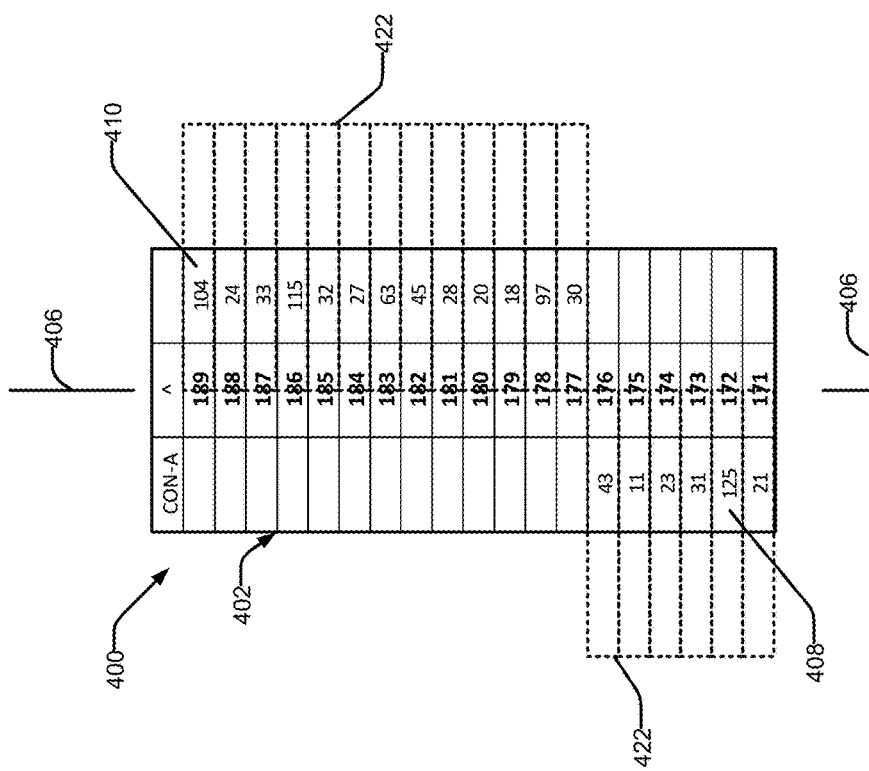

FIGS. 5-7 illustrate the generation of an order entry field 420A for display in an area adjacent to a value level 404A of trading interface 402. In this embodiment, the generation of order entry fields such as field 420A shown in FIG. 5 is responsive to movement of a cursor "C" as directed by a user through a data input device into an activation region 422A associated with the order entry field defined on interface 402 as shown particularly in FIG. 6.

In this embodiment, activation regions are not visible on interface 402 and are defined adjacent to each value level 404 such that movement of a cursor towards a value level 404 will result in the cursor being positioned within an activation region and generate the display of an order entry field. Each activation region is associated with a specific value level 404 and generates an order entry field whereby entering an order amount in the field facilitates the execution of a trade of the tradable object at the price shown in the specific value level 404 associated with the activation region. It should be understood that the relative size and position of the activation regions may vary. However, as exemplified in FIG. 7, each activation region 422 of this embodiment is in a transversely aligned positional relationship perpendicular to the value axis 406 with respect to its associated value level 404 and may extend transversely over a portion or all bid quantity regions 408 and/or ask quantity regions 410 as well as outside of trading interface 402. Order entry fields 420 may be generated and displayed within their respective activation regions 422. For example, when the cursor C enters the activation region 422A shown in FIG. 6, an order entry field 420A (see FIG. 5) may be generated and displayed. Alternatively, when the cursor C enters the activation region 422A shown in FIG. 6, an order entry field 420A (see FIG. 5) may be generated and displayed elsewhere on trading interface 402, display area 400. In other embodiments, adjacent activation regions may overlap and the movement of the cursor C within those regions and/or the projected or calculated trajectory of the cursor C may be utilized to predict which order entry field 420A should be activated.

For example, entering a number X into field 420A would facilitate the execution of a trade of X amount of the tradable object at the price shown in value level 404A, that is, "176." It should be understood that the prices in value levels 404 may change as market data fluctuates and is presented in trading interface 402.

Figure 8:
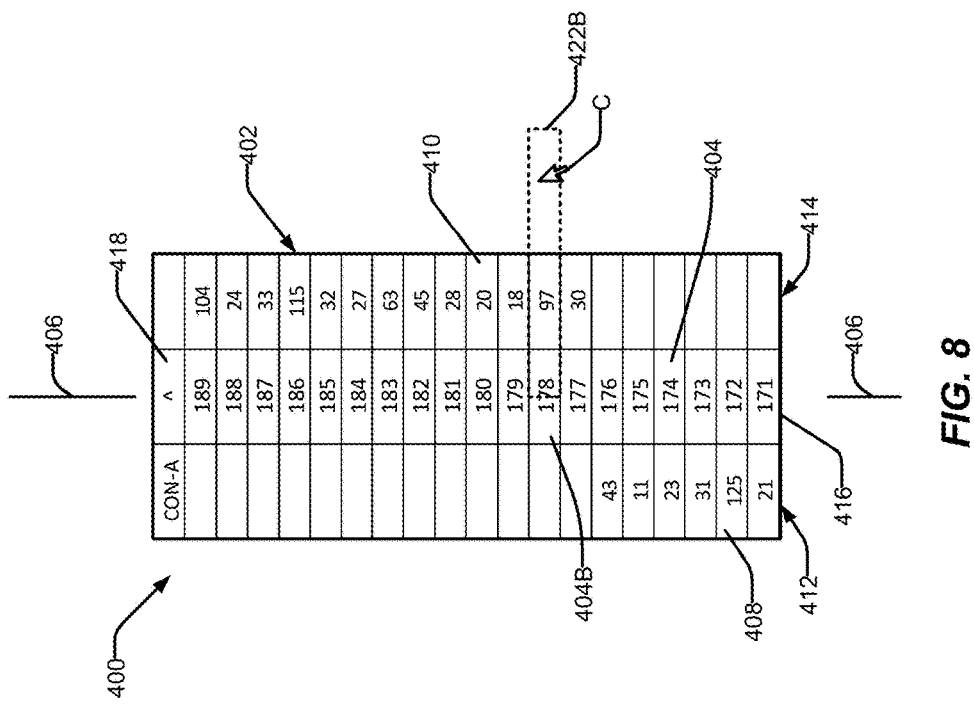
Figure 9:
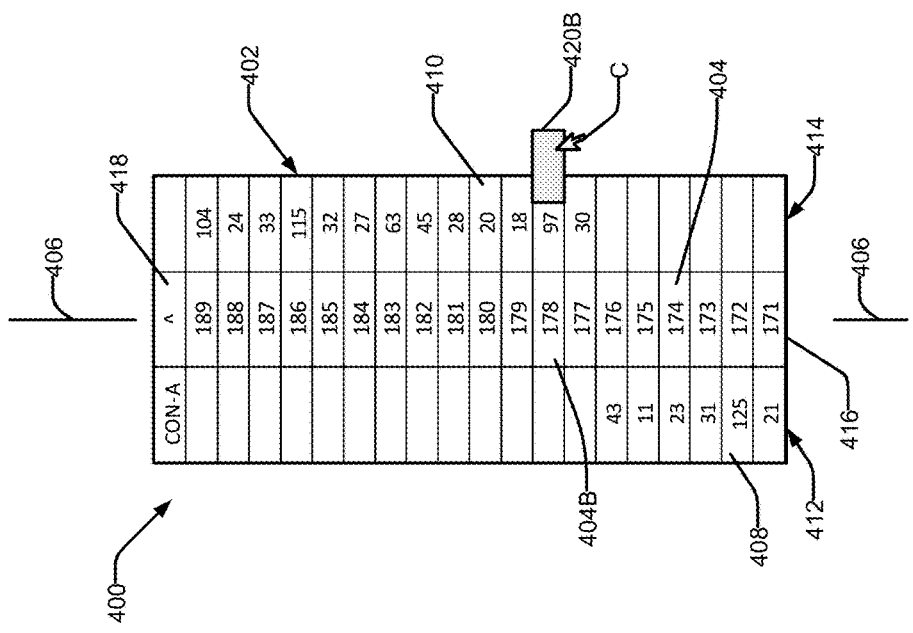

FIGS. 8 and 9 illustrate the generation of an order entry field 420B in FIG. 9 as a result of positioning the cursor C within an activation region 422B in FIG. 8 associated with value level 404B. As discussed above, entering a number X into order entry field 420B in FIG. 9 will facilitate the execution of a trade of X amount of the tradable object at the price shown in value level 404B (i.e., "178").

It should be understood that trading interfaces of the invention, such as interface 402 may incorporate user-friendly features and fit seamlessly with other operating system interfaces, that is, in a framed form having borders, multiple folders, toolbars with pull-down menus, embedded links to other screens and various other selectable features associated with animated graphical representations of depressible buttons that may be can be selected (i.e., "clicked on" or "touched") by the user via input device 318, which may include or comprise a connected mouse, keyboard or touch-enabled display device.

Figure 10:
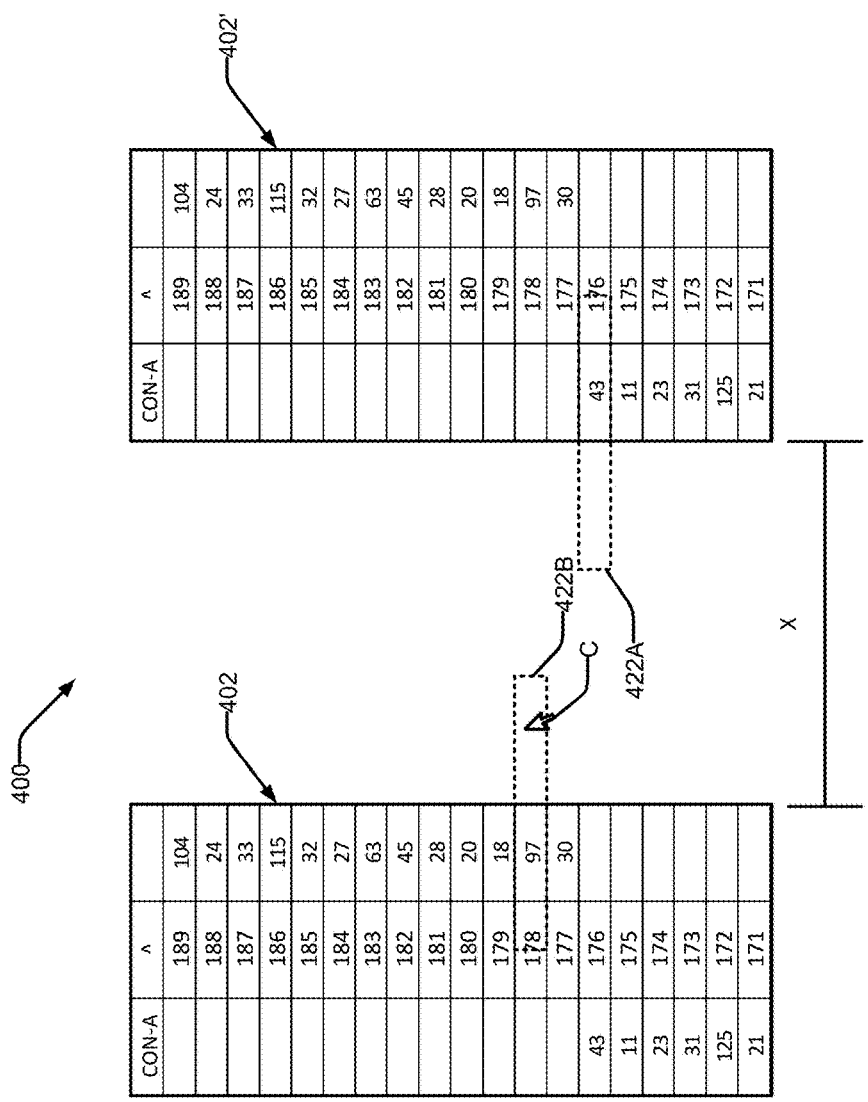
Figure 11:
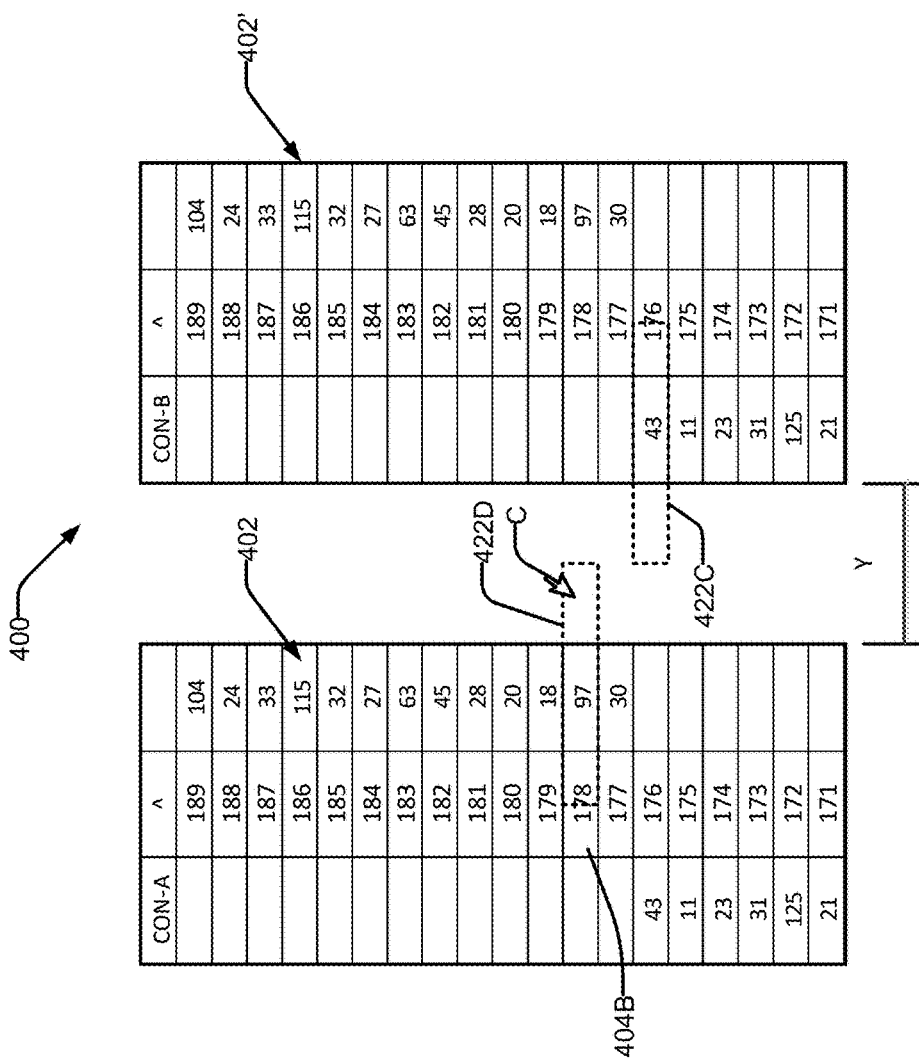

FIGS. 10-12 illustrate a pair of exemplary trading interfaces 402 and 402'generated and displayed in various adjacent positions with respect to one another on a display device in communication with computing device 300 to show the effects of proximity on the size and position of the activation regions 422A and 422B generated by each interface 402 and 402', respectively. FIG. 10 illustrates a pair of trading interfaces 402 and 402' generated and displayed via the display area 400. The example trading interfaces 402 and 402' are positioned a distance X from each other in display area 400 such that the activation region 422B generated by the interface 402 does not interfere with or otherwise influence the definition and creation of another activation region 422A by the interface 402'.

FIG. 1 lillustrates the pair or trading interfaces 402 and 402' from FIG. 10 positioned a distance Y from each other in display area 400. In the illustrated example, the distance X is greater than the distance Y. In other words, the distance between the trading interface 402 and 402' is greater in the illustration shown in FIG. 10 than it is in the illustration shown in FIG. 11. In certain embodiments, the proximity of the two trading interfaces 402 and 402' affects the size and/or shape of the corresponding activation regions 422B and 422A (see FIG. 10). For example, when the trading interface 402 is positioned in close proximity to the trading interface 402' in display area 400 as shown in FIG. 11, the activation regions 422D and 422C automatically resize to the extent necessary to ensure that the regions do not crossover or otherwise interfere with each other. FIG. 12 illustrates an embodiment where the trading interface 402 is positioned substantially adjacent (i.e., the distance between the two interfaces is negligible, zero or near zero) to the trading interface 402'. In the exemplary arrangement of FIG. 12, the activation region 422F and the activation region 422E have been resized and positioned within the respective value levels and quantity regions of the trading interface 402 and 402'.

Figure 13:
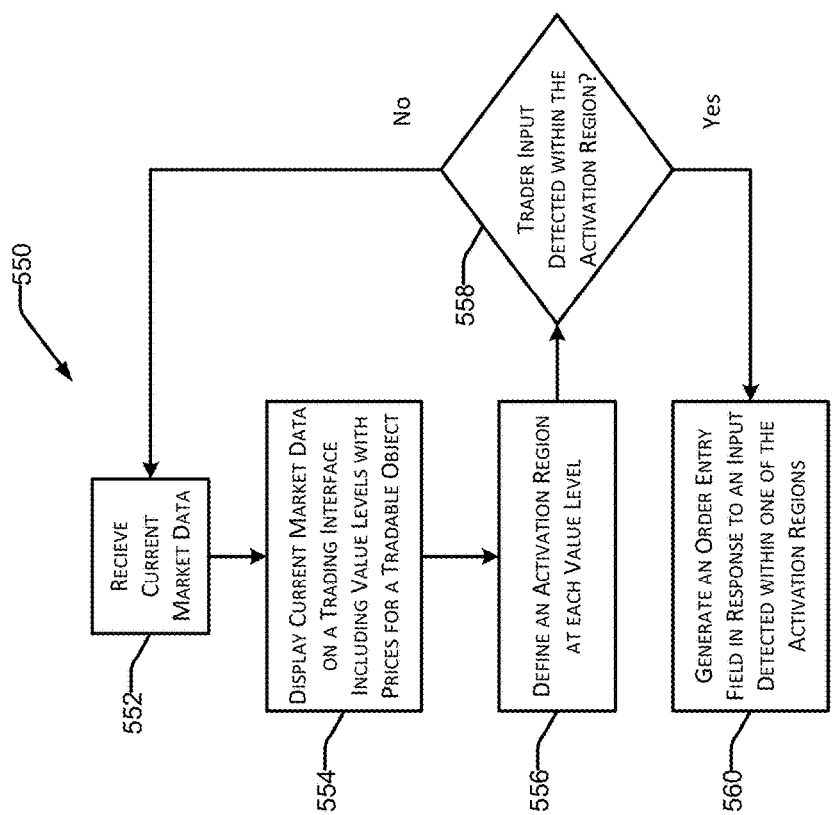
FIG. 13 is a flow diagram illustrating an exemplary method for presenting market data and facilitating the execution of trades through dynamically generated displays of order entry fields on a trading interface, among other things, relating to a tradable object which may be employed with certain disclosed embodiments.

FIG. 13 provides exemplary functional steps of a method of carrying out the invention generally referred to as method 550 through a computing device such as computing device 300.

As shown by step 552, market data for a tradable object is received by, for example, computing device 300, through one or more sources. The most current market data is displayed in step 554 on a display device through a trading interface that formats the market data, such as trading interface 402, which may include displaying prices for the tradable object in value levels, along with bid quantities or ask quantities for the displayed prices.

In step 556, activation regions are defined on the trading interface in a positional relationship with the value levels containing prices for the tradable object, with each activation region being associated with a unique value level containing a price for the tradable object as provided by the most current market data. As shown by steps 558 and 560, an order entry field is generated for display responsive to detecting the cursor or other user input within an activation region. The order entry field generated facilitates execution of a trade at the unique price displayed in the value level associated with the activation region in which the cursor is positioned.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system including:
   a computing device,
   wherein the computing device is configured to display a trading interface including:
   i) a plurality of generally axially aligned value levels defining a value axis, wherein each of the axially aligned value levels corresponds to a price for a tradable object;
   ii) a plurality of ask regions, wherein each ask region of the plurality of ask regions is transversely aligned to a value level of the value axis and contains a value representing an ask quantity at the price corresponding to the transversely aligned value level;
   iii) a plurality of bid regions, wherein each bid region of the plurality of bid regions is transversely aligned to a value level of the value axis and contains a value representing a bid quantity at the price corresponding to the transversely aligned value level;

wherein the computing device is configured to generate a first activation region associated with a first value level of the value axis, wherein the first activation region is transversely aligned to the value level;

wherein the computing device is configured to receive an instance of user input within the first activation region, wherein the instance of user input within the first activation region is received in response to a cursor being moved into the first activation region;

wherein the computing device is configured to generate an order entry field in response to receiving the instance of user input within the first activation region, wherein the order entry field is configured to receive a quantity value from a user to facilitate the placement of a trade of the tradable object at the price corresponding to the first value level associated with the first activation region and for the received quantity value; and wherein the computing device is configured to display the generated order entry field.

2. The system of claim 1, wherein value levels are in sequential order along the value axis.

3. The system of claim 1, wherein the computing device is configured to display the first activation region.

4. The system of claim 1, wherein the first activation region extends transversely at least one of the group consisting of: (a) over a portion of one of a first ask region in the plurality of ask regions and a first bid region in the plurality of bid regions; (b) over all of one of a first ask region in the plurality of ask regions and a first bid region in the plurality of bid regions; (c) outside of one of a first ask region in the plurality of ask regions and a first bid region in the plurality of bid regions; (d) outside of the trading interface; and (e) over a portion of the first value level.

5. The system of claim 1, wherein the order entry field is displayed within the first activation region.

6. The system of claim 1, wherein the order entry field is displayed adjacent to the first value level.

7. The system of claim 1, wherein the order entry field is displayed outside the first activation region.

8. The system of claim 1,
wherein the computing device is configured to receive a quantity value from the user via the displayed order entry field; and
wherein the computing device is configured to send an order for the tradable object at the price associated with the first value level and for the received quantity value.

9. The system of claim 1, wherein the first activation region is generated based on a proximity of a second trading interface.

* * * * *